United States Patent

Roedel

[11] 3,975,827
[45] Aug. 24, 1976

[54] MEASURING APPARATUS

[76] Inventor: Richard K. Roedel, 16816 Dumfries Road, Dumfries, Va. 22026

[22] Filed: Dec. 18, 1974

[21] Appl. No.: 534,055

[52] U.S. Cl. .................................. 33/80; 33/138
[51] Int. Cl.² ..................................... B43L 7/00
[58] Field of Search ............. 33/80, 138; 248/226 E

[56] References Cited
UNITED STATES PATENTS

| | | | |
|---|---|---|---|
| 1,106,152 | 8/1914 | McIntosh et al. | 33/138 |
| 1,351,534 | 8/1920 | Perdue et al. | 33/80 X |
| 1,849,295 | 3/1932 | Hall | 33/138 X |
| 2,237,737 | 4/1941 | Houston | 33/138 X |
| 2,380,073 | 7/1945 | Robinson | 33/138 X |
| 2,696,965 | 12/1954 | Maxwell | 248/226 E |
| 3,144,717 | 8/1964 | Gumaelius | 33/138 |
| 3,662,969 | 5/1972 | King | 33/138 |
| 3,665,612 | 5/1972 | Albright | 33/80 X |
| 3,716,201 | 2/1973 | West | 33/138 |

*Primary Examiner*—Charles E. Phillips
*Attorney, Agent, or Firm*—William G. Gapcynski; Lawrence A. Neureither; Frank R. Agovino

[57] ABSTRACT

Apparatus for use with graphic material supported on a planar surface. Two identical clamps, upon which a reeling means is mounted, are connected by a tape and mounted on the edge of the planar surface. The clamps are U-shaped and have a longitudinal slit in one leg. On the other leg a spool means supported by a housing is attached by a bracket. Each end of the tape is threaded through the slit, around the clamp and connected to the spool means.

8 Claims, 4 Drawing Figures

MEASURING APPARATUS

The invention described herein may be manufactured and used by or for the Government for governmental purposes without the payment of any royalty thereon.

BACKGROUND OF THE INVENTION

1. Field of the Invention

This invention relates to graphic art and deals, more specifically, with an apparatus for positioning a tape, such as a transparent scale, adjacent to a planar surface, such as a drafting board, shadow-box or, more particularly, the ground glass located at the focal plane of a photomechanical or photostat-type camera.

2. Description of the Prior Art

The prior art discloses many devices which are mounted on a drafting board as an aid to drawing. Most prominent is a horizontal or vertical tape of fixed length which can be moved across the surface of the board, such as disclosed in U.S. Pat. No. 1,351,534. These types of appliances are mounted parallel to the edges of the drafting board and allow movement of the tape lengthwise or longitudinally and crosswise or transversely of the board. However, these former inventions do not provide for temporary attachment to the drafting board and do not allow for angular or diagonal placement of the tape. These restrictions have rendered appliances which are not adaptable for use on the ground glass located at the focal plane of photomechanical or photostatic-type cameras. Therefore, measuring images for metric quality at the focal plane requires time consuming conventional slide rule calculations or manual scaling on the back of the ground glass.

SUMMARY OF THE INVENTION

The invention comprises a pair of padded U-shaped clamps. One leg of each clamp has a slit in it and the other leg has attached to it by a bracket a spool supported by a housing. One end of the tape is wound around one spool, threaded around the clamp through the slit to the other clamp where it is engaged in the same manner. The use of the clamp arrangement permits the tape to be placed horizontally or diagonally relative to the boundaries of the planar surface on which the graphic material is supported.

It is the object of this invention to provide a novel clamping means which allows temporary positioning of a tape adjacent to a drafting board, ground glass or similar planar surface used in graphic arts.

A further object of this invention is to provide an apparatus for use on a planar surface which permits positioning of a tape adjacent to the surface at any angle with the edges of the surface.

A further object is to provide an apparatus to measure photographic images on the ground glass located at the focal plane of photomechanical or photostat-type cameras.

BRIEF DESCRIPTION OF THE DRAWINGS

Other objects and features of this invention will become apparent to those skilled in the art by referring to the preferred embodiment described in the following specification and shown in the accompanying drawings in which.

DESCRIPTION OF THE PREFERRED EMBODIMENT

Figure 1:
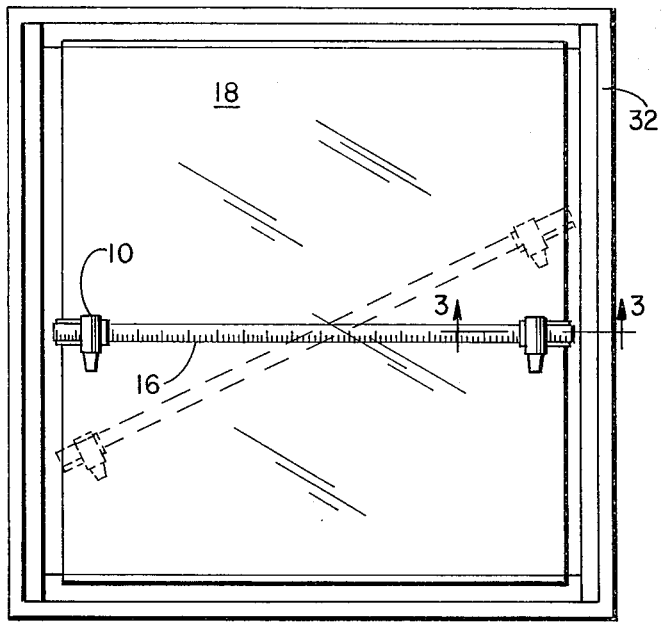
FIG. 1 is a plan view of the apparatus mounted on a ground glass located at the focal plane of a camera.

Referring to the drawing, the graduated tape assembly, as illustrated in FIG. 1, is mounted, for example, at the rear of a conventional photostat-type camera 32 by placing the U-shaped clamps 9 on the edges of the ground glass 18 located at the focal plane. The measuring tape 16 or linear means, which is transparent and interchangeable, can be moved across the ground glass 18, extended or retracted by reeling the tape 16 by turning the knobs 12. This allows any portion of the scale 16a to be visible and in contact with the ground glass 18. The tape 16 is used to measure photographic images or other graphic displays which appear on the ground glass 18. As the image appears, regardless of its position, the tape can be arranged to make an accurate measurement. To accommodate any projected image a bias or angular position can be readily obtained by adjusting the U-shaped clamps 9. The tape 16 adheres to the ground glass 18 by naturally generated static charge through friction caused by the movement of the tape 16 across the ground glass 18, and by tautness created in the tape 16 by rotating the knobs 12 in opposite directions.

Figure 2:
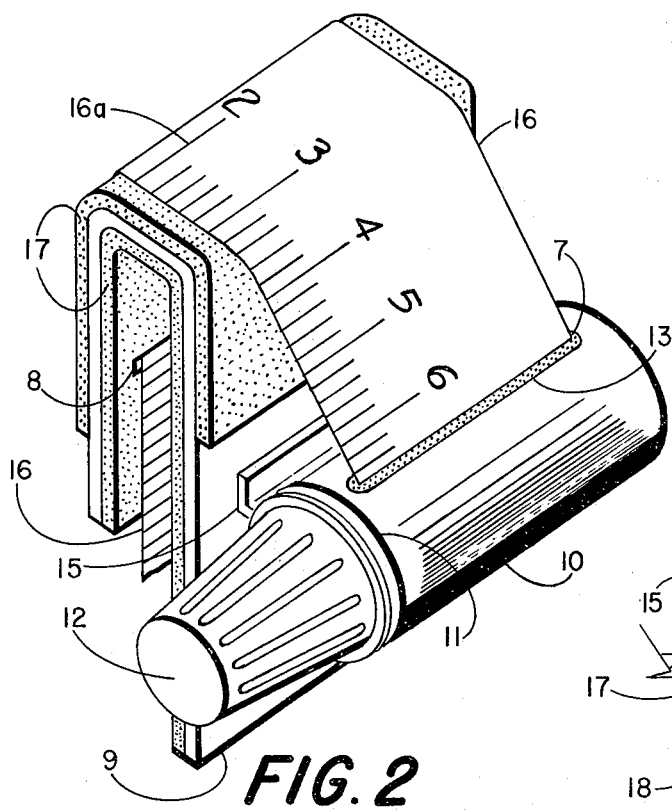
FIG. 2 is an enlarged oblique view of one end of the apparatus unmounted.
Figure 3:
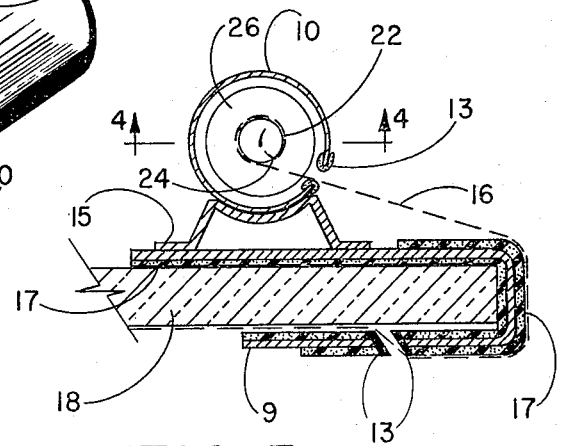
FIG. 3 is an enlarged fragmentary sectional view of one end of the apparatus mounted on the edge of the ground glass taken along line 3—3 of FIG. 1.

Referring to FIG. 2, the foam rubber backing 17 which covers clamps 9 provides a frictional means to keep the tape 16 from slipping in position, and to prevent slippage of the clamps 9 along the edges of the ground glass 18. Felt 13 covers the longitudinal slits 7 and 8 in the housing 10 and the clamps 9, respectively, so that the tape is not damaged while being rolled or unrolled. Housing 10 is supported on the clamp 9 by bracket 15.

Figure 4:
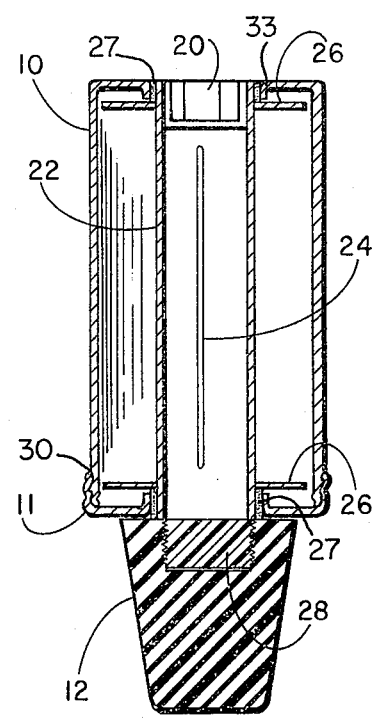
FIG. 4 is an enlarged sectional view showing only the reeling means of the U-shaped clamp taken along line 4—4 of FIG. 3.

Referring to FIG. 4, discs 26 are located at the ends of the spool 22 to guide the tape 16 on and off the cylinder portion of the spool 22, and hold the spool 22 centered within the housing 10. Mounting means, such as resilient bearings 27 are located in a centered opening of the closed end 33 of the housing 10 and in the centered opening in the housing cap 11. The bearings 27 support the spool 22. Spool end 28 extends beyond the threaded housing cap 11 to threadably engage the knob 12, which is internally threaded. The other spool end 22 is provided with a hexagonal recess 20. One end of the housing 10 is provided with external threads 30 so the housing cap 11, which is threaded internally, can easily be removed.

Referring to FIG. 4, longitudinal slit 24 in spool 22 is provided as a means for engaging the tape 16 and to allow easy threading, unthreading and exchange of the tape 16.

To remove tape 16, knobs 12 are rotated until the entire tape 16 is unwound. The tape 16 is then pulled out of slits 7 and 24 around the bight portion of clamp 9 and out of slot 8.

To remove the spool 22 a hexagonal wrench is placed in recess 20 to hold spool 22 in place while knob 12 is unscrewed and removed. Housing cap 11 is then unscrewed and removed, permitting access to and removal of spool 22.

To re-thread tape 16, each end should be threaded through slit 8 and around clamp 9. Knob 12 is turned until slit 24 is lined up with slit 7. The tape 16 is threaded through both slits 7 and 24 and knob 12 is turned until the spool 22 engages tape 16.

Although I have here described the preferred embodiment of my novel invention, many variations and modifications will now be apparent to those skilled in the art, and I therefore prefer to be limited, not by the specific disclosure herein, but only by the appending claims.

I claim:
1. Apparatus for use in combination with a base member having planar surfaces, said apparatus comprising:
   a. linear means extending across and adjacent to a planar surface of said base member;
   b. a pair of opposing U-shaped clamping means, each having a bight portion and two leg portions extending from the bight portion and adapted to engage the planar surfaces of said base member, one leg of each clamping means having a transverse slit located intermediate thereof, reeling means mounted on the opposite leg of each said clamping means and engaging an end of said linear means; when said pair of clamping means are clamped on said base member said linear means extends from said reeling means on one clamping means around said bight portion, through said slit, along one of said planer surfaces, through the slit around the bight portion and connected to the reeling means of the other of said clamping means, such that said linear means will pass between one of said planar surfaces of said base member and the portion of each leg extending past said slit;
   c. said U-shaped clamping means being selectively, uniformly and relatively movable over said planar surfaces along the edges of said base member.

2. The apparatus as in claim 1 wherein said reeling means comprises:
   a. spool means provided with means for engaging an end of said linear means; and
   b. means for rotatably supporting said spool means.

3. The apparatus as in claim 2 wherein said reeling means further comprises:
   a. housing means for containing said reeling means;
   b. an opening in said housing means permitting passage therethrough of the linear means; and
   c. protective covering means for the edges of said opening in said housing means to prevent damage to the linear means.

4. The apparatus as in claim 3 wherein said housing has a threaded opening at one end of said housing and a centered opening in the opposite closed end of said housing; a threaded cover having a centered opening therein, said cover engaging said threaded opening in said housing, said centered openings in said closed end and in said threaded cover being horizontally aligned; mounting means disposed in said centered openings for rotatably supporting said spool means, said spool means extending beyond said opening in said threaded cover; threadably engaging means for rotating said spool means; and disc means surrounding said spool means and located inwardly of said mounting means to prevent longitudinal movement of said spool means.

5. The apparatus as in claim 4 wherein said means for engaging an end of said linear means has a cylinder with a longitudinal slit; said threadably engaging means is a knob; and said mounting means is a resilient bearing.

6. The apparatus as in claim 1 wherein said linear means comprises a tape of a width less than said spool means and a length sufficient to span the longest dimension of the base member and engage said reeling means.

7. The apparatus as in claim 6 wherein said tape has imprinted thereon a graduated scale on a transparent material.

8. Apparatus for use with graphic material supported on a base member comprising:
   a. a pair of opposing U-shaped clamps with a slit transverse to the length of and located in one of the legs of each of said U-shaped clamps, each clamp being selectively, uniformly and relatively movable to the planar surface along opposing edges of the base member, the edges of said transverse slit being covered with felt and said U-shaped clamps being covered with foam rubber;
   b. housing means mounted on an opposite leg of each of said U-shaped clamps, each said housing means having a threaded opening at one end thereof, a centered opening in the opposite closed end thereof and a first longitudinal slit in the wall of each of said housing means, the edges of which are covered with felt;
   c. a threaded cover for each of said housing means having a centered opening therein, said cover engaging said threaded opening in each of said housing means, said opening in said closed end of each of said housing means and said opening in each of said threaded covers being horizontally aligned, and having resilient bearings disposed in said openings;
   d. a cylinder in each of said housing means supported in said resilient bearings and having a second longitudinal slit in the wall of said cylinder, each said cylinder extending at one end beyond said resilient bearing in said centered opening in said threaded cover, said extension threadably engaging a knob and discs surrounding each of said cylinders located inwardly of said resilient bearings to prevent longitudinal movement of said cylinders;
   e. a tape having imprinted thereon a graduated scale, said tape secured at the terminal ends thereof by said second longitudinal slit and passing through said first longitudinal slit of one of said housing means in contact with the outer surface of the bight portion of one of said U-shaped clamps and passing through said transverse slit thereof for extension beneath the base member through said transverse slit of an opposed U-shaped clamp and in contact with the bight portion thereof and terminating in said second longitudinal slit in an opposed U-shaped clamp; and
   f. a bracket having ends attached to each said opposite leg of each of said U-shaped clamps, the center of said brackets being raised and shaped to form a seat for said housing to be attached.

* * * * *